United States Patent [19]

Baughman et al.

[11] Patent Number: 5,006,900
[45] Date of Patent: Apr. 9, 1991

[54] TRANSFER APPARATUS HAVING VACUUM HOLES AND METHOD OF MAKING SUCH APPARATUS

[75] Inventors: Richard C. Baughman, Geneseo; David J. Ellingham, Rochester; William Y. Fowlkes, Brockport; Bruce J. Rubin; Frank S. Stepanik, both of Rochester, all of N.Y.

[73] Assignee: Eastman Kodak Company, Rochester, N.Y.

[21] Appl. No.: 375,110

[22] Filed: Jul. 3, 1989

[51] Int. Cl.⁵ .......................................... G03G 15/00
[52] U.S. Cl. .................................. 355/271; 355/272; 355/326
[58] Field of Search ............... 355/312, 271, 274, 272, 355/326, 327

[56] References Cited

U.S. PATENT DOCUMENTS

| | | |
|---|---|---|
| 3,633,543 | 1/1972 | Pitasi . |
| 3,781,105 | 12/1973 | Meagher . |
| 3,832,055 | 8/1974 | Hamaker . |
| 3,900,591 | 8/1975 | Kline . |
| 4,080,053 | 3/1978 | Friday . |
| 4,403,847 | 9/1983 | Chrestensen . |
| 4,408,866 | 10/1983 | Gustafson .......................... 355/317 |
| 4,712,906 | 12/1987 | Bothner et al. . |
| 4,724,458 | 2/1988 | Roy et al. ............................ 355/274 |
| 4,740,813 | 4/1988 | Roy .................................... 355/274 |

OTHER PUBLICATIONS

Research Disclosure, Dec. 1980, No. 200, p. 526. Disclosed by R. D. May and P. B. Wood.

Primary Examiner—R. L. Moses
Attorney, Agent, or Firm—Leonard W. Treash, Jr.

[57] ABSTRACT

A transfer apparatus includes a transfer member, for example, a transfer drum with a line of small closely spaced laser drilled vacuum holes to hold a receiving sheet to the drum surface. To maintain the continuity of a transfer field but be free from clogging, the holes are narrow near the surface of the drum but wider as they extend deeper in the drum.

Conical holes are drilled in the drum by a laser. In one embodiment, a short focal length lens focuses a laser bear near the surface of the drum which beam spreads below the surface to form a conical hole.

10 Claims, 6 Drawing Sheets

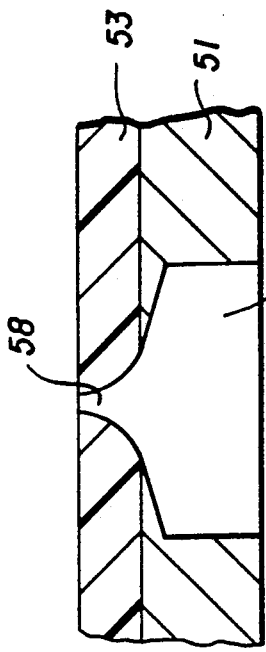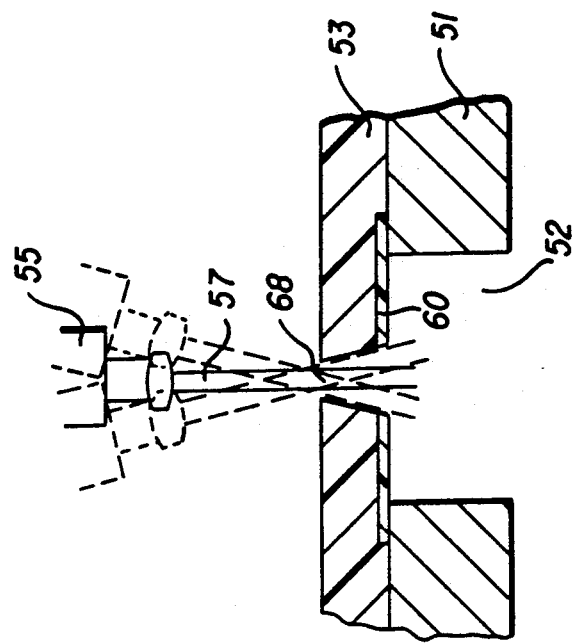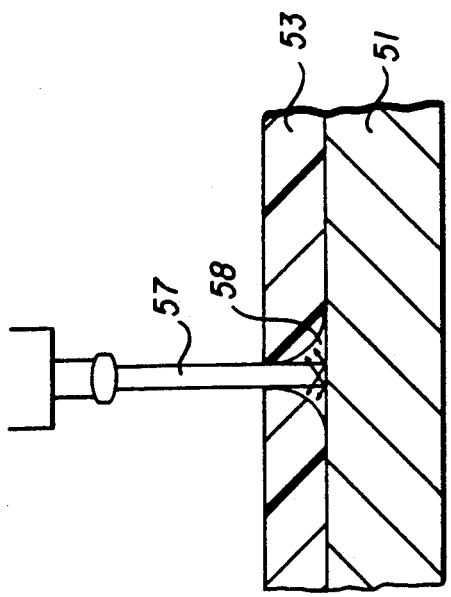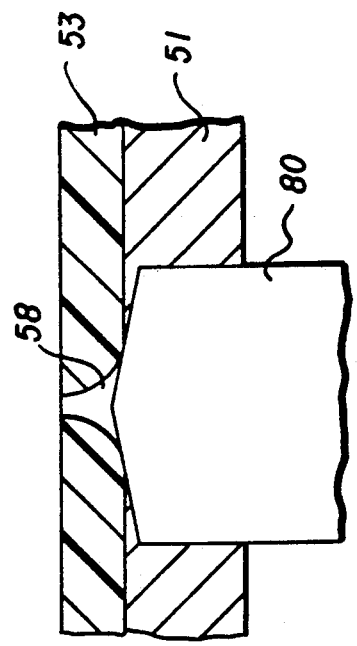

TRANSFER APPARATUS HAVING VACUUM HOLES AND METHOD OF MAKING SUCH APPARATUS

RELATED APPLICATIONS

This application is related to co-assigned:

U.S. patent application Ser. No. 375,105; now U.S. Pat. No. 4,949,129, issued Aug. 14, 1990, filed July 3, 1989. APPARATUS FOR TRANSFERRING TONER IMAGES TO A RECEIVING SHEET, William Y. Fowlkes et al.

U.S. patent application Ser. No. 375,240 filed July 3, 1989, TRANSFER APPARATUS HAVING A TRANSFER MEMBER WITH VACUUM MEANS, Marcus S. Bermel et al.

U.S. patent application Ser. No. 375,165; now U.S. Pat. No. 4,941,020, issued July 10, 1990. filed July 3, 1989, TRANSFER APPARATUS HAVING VACUUM HOLES FOR HOLDING A RECEIVING SHEET, Richard C. Baughman et al.

TECHNICAL FIELD

This invention relates to apparatus for transferring electrostatically held toner images to a receiving sheet. More specifically, this invention relates to such apparatus including a transfer drum having vacuum holes or the like for holding the receiving sheet as it passes through transfer relation with a toner image. It also relates to a method of making such a transfer drum.

BACKGROUND OF THE INVENTION

U.S. Pat. No. 4,712,906, Bothner et al, shows an electrophotographic color printer which forms consecutive images in different colors that are transferred in registry to a receiving sheet. The receiving sheet is wrapped on a transfer drum or roller and recirculated on the surface of the drum into transfer relation with the consecutive images to create a multicolor image on the sheets. To improve efficiency, large sheets, for example, "ledger" size sheets are placed on the drum with the small dimension parallel to the axis of the drum and wrapped substantially around the transfer drum. Small sheets, for example, "letter" size sheets are placed with their long dimension parallel to the axis of the drum. Since the short dimension of letter size sheets is approximately half the long dimension of ledger size sheets, two letter size sheets are placed on the drum in approximately the same space as the single ledger size sheet.

Prior to the Bothner invention, commercial color image transfer devices secured the receiving sheet to the transfer drum with small gripping fingers that grip the leading edge of the sheet. Many other methods are mentioned in the literature, for example, vacuum holes, electrostatics or various combinations of vacuum holes, electrostatics and gripping fingers. The gripping fingers were preferred commercially because they more firmly hold the sheet against slippage, which slippage would degrade the registration of the color images.

However, the Bothner invention is difficult to utilize with gripping fingers because the leading edge of the second letter size sheet is positioned at approximately the middle of a ledger size sheet. For some applications, retractable fingers may be made to work, but for many applications they would leave substantial image artifacts in a ledger size sheet. Bothner therefore suggests the use of vacuum holes which are positioned at the leading edge of each of the smaller sheets and may or may not both be activated for the ledger size sheet.

To firmly hold fairly heavy stock the holes were made as large as 3-6 mm in diameter and placed less than one to a centimeter in a line across the drum.

The vacuum holes shown in Bothner work fine in many situations. However, under some conditions, the vacuum holes show up on the final image as small round areas of incomplete toner transfer. This is especially true in dry ambient conditions, with transparency receiving stock and with the second transfer to duplex receiving sheets where the receiving sheet has been dried by a prior fusing step.

Even in dry conditions, the artifacts may be acceptable if they were confined to the leading edge of all sheets, where image information is unlikely. However, the Bothner apparatus forces at least one line of vacuum holes, for the leading edge of the second small sheet, to the middle of a large sheet. Further, in different sheet holding applications, it may be necessary to put vacuum holes at the trailing edge as well as the leading edge of at least some sheets. If a variety of sheet sizes is to be available, many lines of trailing edge holes will be necessary. Vacuum holes on the trailing edges of a variety of sheets place many lines of holes in the middle of larger sheets, depending on the mixture of sizes available in the machine.

U.S. Pat. No. 4,080,053, Friday, shows a vacuum web transport for a copy sheet through a transfer station having a rather lengthly transfer area formed by parallel portions of the transfer web and a photoconductive web. To prevent what the reference termed "vacuum hole printout", the effective position of the holes is gradually moved to different locations during passage through the transfer zone. Whatever the effectiveness of this solution for the apparatus shown, it would not be useful with the relatively small transfer zone formed by a transfer drum with either an image carrying web or drum.

The Bothner apparatus shows a transfer drum having an aluminum base with a polyurethane coating of intermediate conductivity. The intermediate conductivity allows the creation of a relatively strong transfer electric field without electrical breakdown in the nip. It is believed that the failure to transfer toner over a vacuum hole is due to lack of continuity of the electric field in that region when a less conductive, for example, a dry transfer sheet is being used.

DISCLOSURE OF THE INVENTION

It is the object of the invention to provide an apparatus for transferring electrostatically held toner images to a receiving sheet, which receiving sheet is held by a vacuum to a transfer member, with a reduction of the aforementioned image defect associated with vacuum holes.

This and other objects are accomplished by a transfer member which has a line of closely spaced laser drilled holes.

According to a preferred embodiment each of the laser drilled holes is generally conical in shape, that is, it is larger at the inner surface of the outer layer of the transfer member than it is at the outer surface. With such a configuration the narrow opening at the top of the hole provides electrical continuity for the electric field in the vicinity of the hole but the wider lower portion of the hole keeps the hole from clogging up with paper dust, toner particles, fusing oil, and the like.

It is also an object of the invention to provide a method for making a transfer drum or member that, in use, has a reduction in the aforementioned image defect associated with vacuum holes.

This and other objects are accomplished by the steps of forming a layer of appropriate conductivity material on the surface of a core, forming vacuum opening means in the core and laser drilling in said layer a plurality of small holes communicating with said opening means.

According to a preferred embodiment of the inventive method, the opening means is formed in the core. Then, flow preventing means is applied to the core to prevent a flow of material into the opening means. The top layer is coated on top of the core providing a layer partly defined by the flow preventing means. The top layer is then laser drilled.

According to a another preferred embodiment, holes that are generally conically shaped are formed in the transfer drum by three alternative methods.

In the first method a short focal length lens is used to focus the laser beam at a position in the vicinity of the outer surface of the outer layer of the drum. The focal length of the lens is such that the beam spreads as it approaches the inner surface of the layer providing a conically shaped hole.

According to a second alternative method, the direction of a laser beam is rotated relative to the outer surface of the outer layer of the drum around a position in the vicinity of the outer surface to form a generally conically shaped hole having a neck at that position.

A third alternative method of forming generally conically shaped vacuum holes is to form the exterior layer of the drum on a generally reflective core, for example, a normal aluminum core. As the hole is drilled with the laser, laser light will reflect off the aluminum core destroying some of the layer material next to the core thereby forming a generally conically shaped hole. According to this method it is generally preferable to form the vacuum opening means in the core after formation of the conically shaped hole.

BRIEF DESCRIPTION OF THE DRAWINGS

In the detailed description of the preferred embodiment of the invention presented below reference is made to the accompanying drawings, in which:

FIGS. 10, 11 and 12 are side sections similar to FIG. 6, illustrating another embodiment of a method of making a vacuum hole, which vacuum hole is shown in FIG. 12.

FIG. 13 is a side cross-section similar to FIG. 6 illustrating another embodiment of making a vacuum hole according to the invention.

BEST MODE OF CARRYING OUT THE INVENTION

Figure 1:
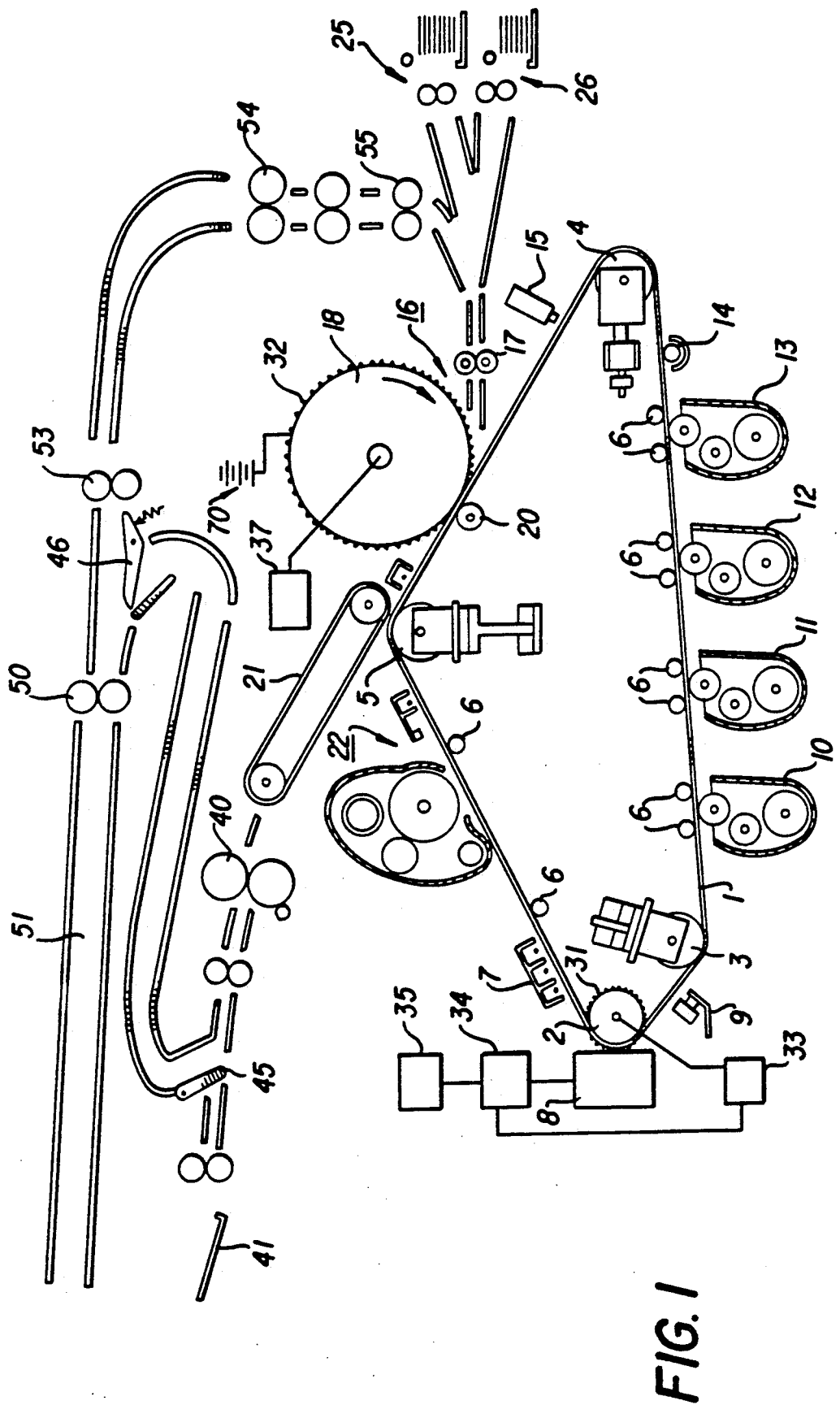
FIG. 1 is a schematic side view of a printer constructed according to the invention, with many parts eliminated for clarity of illustration.

According to FIG. 1 a film core portion of a copier or printer includes an image bearing member, for example, an endless electrophotoconductive web 1 entrained about a series of primary rollers 2, 3, 4 and 5, and other supporting structure, for example, film skis 6.

Web 1 is driven through a series of electrophotographic stations generally well-known in the art. More specifically, a uniform charge is laid down on the web 1 by a charging station 7. The uniformly charged web moves around printheld roller 2 which is directly opposite an LED printhead 8 which LED printhead exposes the web 1 in a manner well-known in the art. The web then moves into operative relation with an electrometer 9 which senses the level of a charge existing after exposure of the web by printhead 8, to help control the process.

The web then moves into operative relation with a series of toning or developing stations 10, 11, 12 and 13. Each image created by printhead 8 is toned by one of the toning stations. After being toned the web passes a magnetic scavenger 14 which removes excess iron particles picked up in the toning process. After the electrostatic image has been toned the web passes under a densitometer 15 which measures the density of the toner image also for use in controlling the process. The toner image then proceeds to a transfer station 16 where the image is transferred to a transfer surface of a receiving sheet carried by a transfer drum 18.

The transfer drum 18 includes vacuum holes 19 (FIGS. 2-3) for securing the receiving sheet thereto for repeated presentations to web 1. The transfer drum 18 cooperates with web 1 to incrementally bring the receiving sheet and the toner image into transfer relation so that the toner image is transferred to the receiving sheet. As is well known in the art, this is generally accomplished in the presence of an electric field which is created by biasing the transfer drum by a suitable biasing means, for example, electrical source 70, compared to the conductive layer of the web 1 or to a backing roller 20 for the web. This process has been well-known in the art for many years, see for example, U.S. Pat. No. 3,702,482. Although either the web 1 or the drum 18 could be at ground, conventionally the conductive backing is at ground and the drum at a relatively high voltage. For example, if the toner to be transferred is positively charged, the drum can be biased to −3000 V by electrical source 70.

As thoroughly discussed in U.S. Pat. No. 4,712,906, cited above, when the apparatus is operating in a multi-image mode, for example, a multicolor mode, consecutive images or pairs of images are toned with different colored toners using the different toning stations 10-13. These consecutive images are transferred in registry to the receiving sheet as it repeatedly is brought into transfer relation with the web 1 by the drum 18. After the transfer operation is complete, the receiving sheet is allowed to follow the web, for example, by removing the vacuum holding it to the drum 18 or by stripping the sheet with a skive, other conventional stripping mechanism, or both. The receiving sheet is separated from the web with the aid of an electrostatic sheet transport mechanism 21 and is transported to a fuser 40. The web is then cleaned by the application of a neutralizing corona and a neutralizing erase lamp and a magnetic brush cleaning mechanism all located at a cleaning station 22.

Figure 2:
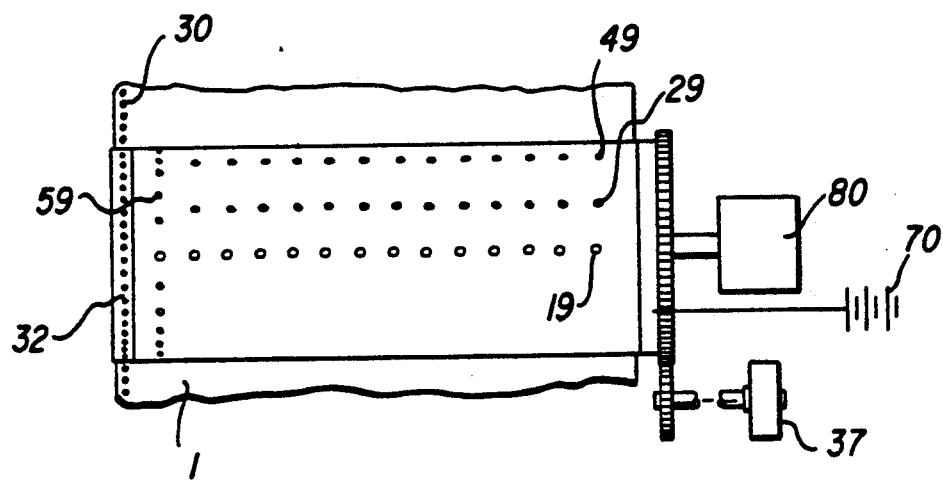
FIG. 2 is a top view of a portion of a transfer apparatus in which the invention is usable.

The transfer drum 18 is driven by a motor 37, the drum 18 in turn driving the web 1 through a sprocket 32 which engages perforations 30 (FIG. 2). The sprocket 32 also forms part of a registration and timing system which includes a sprocket 31 on printhead roller 2 which sprocket is linked to an encoder 33. The encoder 33 feeds signals indicative of the angular position of sprocket 31 to a drive 34 for the printhead 8 which drive 34 times the application of information from an information source 35 to the printhead 8.

After the receiving sheet leaves the fuser 40 it can go directly to an output tray 41 or be deflected by a deflector 45 into a duplex path according to the position of deflector 45, the position of which is controlled by the logic of the apparatus through means not shown. The duplex path moves the sheet by rollers and guides directing it first through a passive deflector 46 into turn-around rollers 50. Turn-around rollers 50 are independently driven to drive the receiving sheet into turn-around guide means 51 until the trailing edge thereof has been sensed by an appropriate sensor, not shown, to have passed passive diverter 46. Once the trailing edge has passed passive diverter 46 the turn-around rollers 50 are reversed and the receiving sheet is driven by rollers 50 and other sets of drive rollers 52, 53, and 54 back to a position upstream of the transfer station 16. The receiving sheet can pass through registration mechanisms for correcting for skew, crosstrack misalignment and in-track misalignment and ultimately stop at alignment rollers 55.

Transfer station 16 receives sheets from any of three sources. First, it can receive sheets of one particular size from a first supply 25, which first supply may include, for example, letter size sheets being fed with their short dimension parallel with the direction of feed. Second, it may receive sheets from a second supply 26, which, for example, may include ledger size sheets with their long dimension parallel to the direction of movement. Third, the transfer station 16 may receive sheets from the duplex path as controlled by rollers 55 which may include either size sheet and would already contain a fused image on its upper side. The receiving sheets from whatever source, stop against timing rollers 17. In response to a signal from the logic and control of the apparatus, not shown, timing rollers 17 accelerate to drive the receiving sheet into the nip between the transfer drum 18 and the web 1 as the first toner image to be transferred approaches the nip.

The duplex path is of a length that takes multiple sheets at one time depending on the length of the sheets. For example, four letter size sheets may be in the duplex path at one time or two ledger size sheets. If the printer is printing different images on different sheets, the logic and control of the apparatus must supply the necessary programming to the exposure and toning stations so that the sheets ultimately fed to the output tray 41 are in the correct order considering the number of sheets that must be in the duplex path. Such programming is known in the art, see, for example, U.S. Pat. No. 4,453,841 (Mead).

Figure 3:
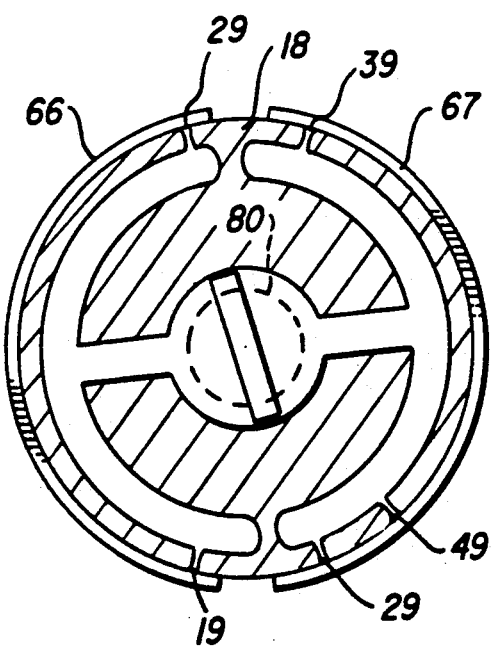
FIG. 3 is a cross-section of a transfer drum shown in FIG. 2.

Transfer drum 18 is best seen in FIGS. 2 and 3. According to FIG. 2, vacuum holes 19 are positioned across the length of drum 18 to grip the leading edge of a receiving sheet. Vacuum is applied to the holes from a source of vacuum shown schematically as 80 through suitable conduits and valves, some of which are not shown. U.S. Pat. No. 4,712,906 is incorporated by reference herein and shows more details of a suitable mechanism for applying and releasing the vacuum at the appropriate times for the holes gripping the leading edges of receiving sheets.

The drum 18 has an aluminum core and a polyurethane outer layer. Preferably, the polyurethane is of an intermediate conductivity, for example, it may have a resistivity of $5 \times 10^9$ ohm/cm. Transfer drums having an outer layer or layers of intermediate conductivity are well-known and have certain advantages over drums having greater conductivity. The outer layer is shown as a single layer, but can be formed of more than one layer. See, for example, U.S. Pat. No. 3,781,105, Meagher, issued Dec. 25, 1973 for a discussion of some of the advantages of intermediate conductivity transfer drums and illustrating use of a two outer layer drum. The polyurethane layer is conductive in the sense that it helps establish the electrical field urging transfer.

As seen in FIG. 3, vacuum holes 19 grip the leading edge of a first letter sized receiving sheet 66 which encompasses slightly less than half the circumference of the drum 18. The leading edge of a second letter size sheet 67 is gripped by another row of vacuum holes 39. For many grades of paper, vacuum holes for the leading edge are adequate. However, for best holding of a wide grade of materials, including transparency stock, vacuum holes 29 located along the trailing edge of the sheets assist in the holding process, preventing creep of the receiving sheet on the drum surface and thereby preventing misregistration of images. Additionally, a set of vacuum holes 59 (FIG. 2) can be positioned along one or both lateral edges of the image areas to provide additional holding force.

If a ledger sized receiving sheet is to be used, the leading edge is still attached using vacuum holes 19, but the sheet will stretch across one row of holes 29 and the row of holes 39 ending up short of the second row of holes 29. To secure the trailing edge of ledger sheets an additional row of holes 49 is provided. If the trailing edge of other sizes of sheets (for example, legal size) is to be secured, additional rows of holes for the additional trailing edges will be necessary.

Thus, even without the holes securing the trailing edges, at least one row of vacuum holes will lie underneath the primary image area during the transfer process of a ledger size sheet. With the additional rows of holes to secure the trailing edge of sheets, the number of holes is multiplied. Under some conditions, the vacuum holes do not have an adverse effect on the final image. However, for many conditions, especially with a dry receiving sheet, for example, a sheet that has been through a fuser once and is now receiving the second side of a duplex copy or a resin sheet, as is used to make a transparency, insufficient transfer is present in the portion of the sheet overlying the vacuum holes. This shows up on a white receiving sheet as a white spot in the image. This phenomena is believed to be due to the fact that transfer is accomplished primarily by a relatively strong electric field between the surface of the drum 18 and a conductive backing for the web 1. In a humid environment, the paper is conductive and provides some continuity of the field over the holes. In dry conditions, the receiving sheet is less conductive and that field loses continuity over the holes. The toner does not transfer, staying on the surface of web 1.

Figure 4:
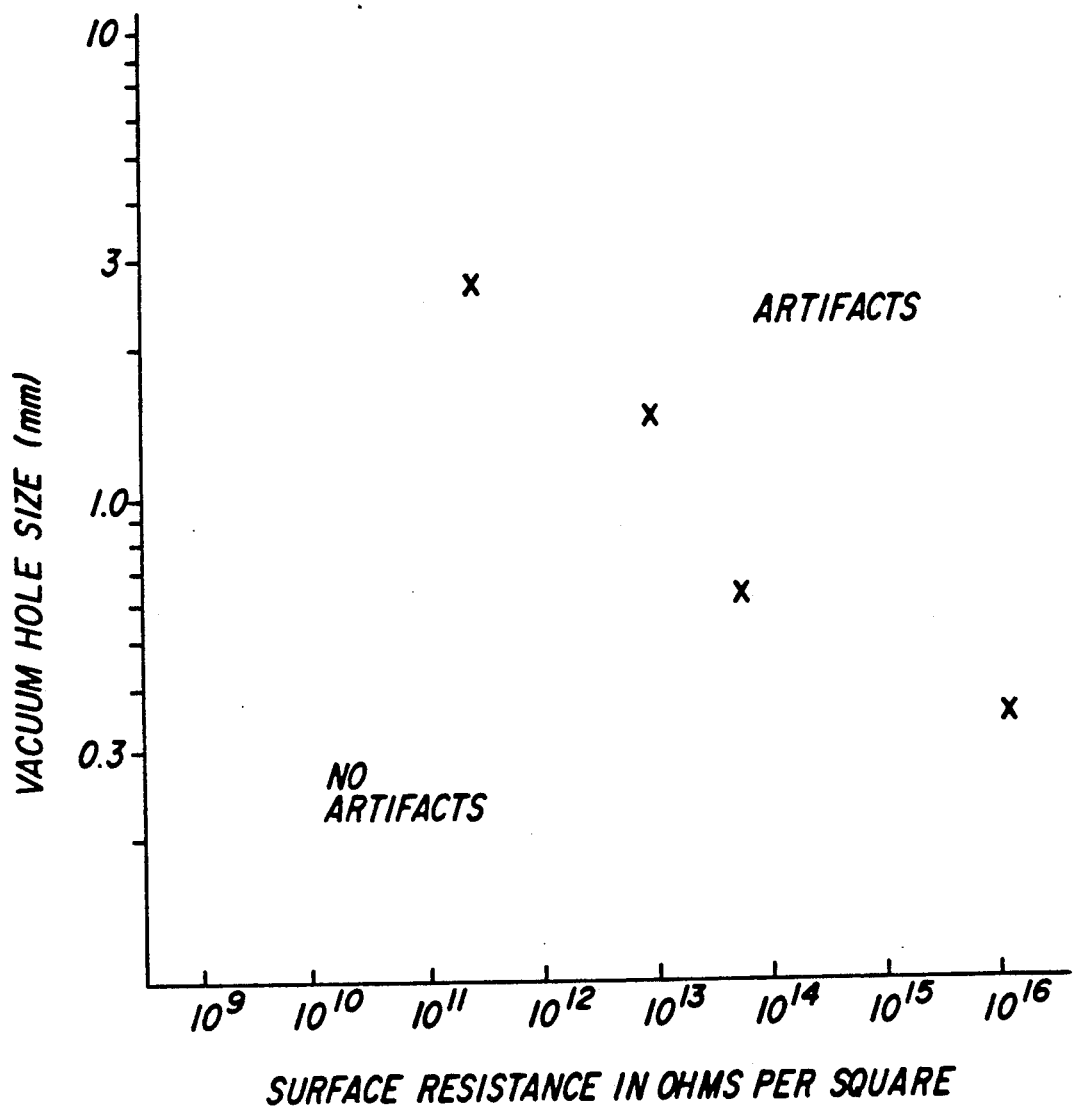
FIG. 4 is a graph illustrating the relationship of vacuum hole size, the presence of artifacts and the surface resistance of the receiving sheet.

Extremely small vacuum holes do not disrupt the transfer field enough to cause objectionable visual artifacts. The diameter of the vacuum hole that does not show a visible artifact varies inversely with the resistance of the receiving sheets. This is demonstrated in FIG. 4 where the diameter of a vacuum hole which is at the threshold of defect visibility is plotted against the surface resistivity of the receiving sheet. A normal sheet of paper in a relatively humid environment may not show a defect with a vacuum hole as large as 3.0 mm or larger. However, a resin based sheet commonly used for transparencies may still show a defect with holes at or below 0.4 mm in diameter. To handle a variety of paper receivers in the most common dry conditions, the hole should have a diameter less than 1.0 mm. However, for highest quality results in very dry conditions, especially with duplex copies, 0.5 mm to 0.65 mm diameter holes are preferred.

To avoid any visual defects in the least conductive transparencies, hole diameters less than 0.4 mm are necessary. The problem with transparencies can be treated in several ways. Some transparency stock is more conductive, e.g., $10^{13}$-$10^{14}$ ohms/square in resistivity. Such stock can be used with holes between 0.50 and 0.65 mm without the artifact. Even with less conductive stock, the defect with an opening 0.5 to 0.65 mm in a transparency is a very small defect. If, in the apparatus shown in FIG. 1, most transparency reproductions are letter size, the defect may only occur in the margin of transparencies, and being small may be acceptable. Alternatively, very small 0.4 mm openings can be used. Some of the preferred embodiments of the invention produce openings that small that will not clog in a relatively clean machine environment. For most applications, however, the former approach with 0.5 to 0.65 mm openings and more conductive transparency stock is preferred.

As the size of the vacuum hole is reduced, the holding power of the vacuum is also reduced, the holes have a tendency to plug up, and manufactureability of the hole becomes a problem. According to the invention, we have solved these problems by providing a large number of small laser drilled holes, shown greatly magnified in FIG. 5. Preferably, they are placed in a straight line and as close together as possible while maintaining the structural integrity of the outer layer of the transfer drum. For example, with relatively precise laser drilling in excess of 4 holes 1 mm in diameter can be obtained to the centimeter. With smaller sized holes, more density can be obtained.

Figure 5:
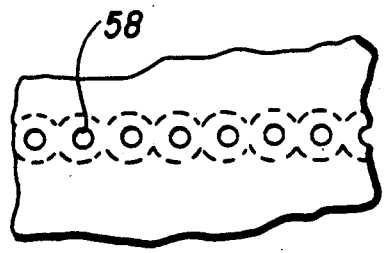
FIG. 5 is a schematic top view of a portion of a row of vacuum holes constructed according to the invention showing the top of the vacuum holes in solid lines and the bottoms of the vacuum holes in phantom.

Preferably, to prevent clogging of the holes with paper dust, toner particles, fusing oil, and the like, the holes have been drilled in a generally conical shape. With this conical shape the narrow portion of the hole shown in solid circles in FIG. 5 provides the continuity for the transfer field while the rest of the hole, being gradually larger, as it goes toward the inside of the drum is less restricting and less likely to clog with particles. Using this structure we have found that substantial vacuum force can be consistently applied with holes having a diameter (at their neck) even less than a 0.5 to 0.65 mm range. Within this range, electrical continuity of the field is excellent for high resolution images.

Figure 6:
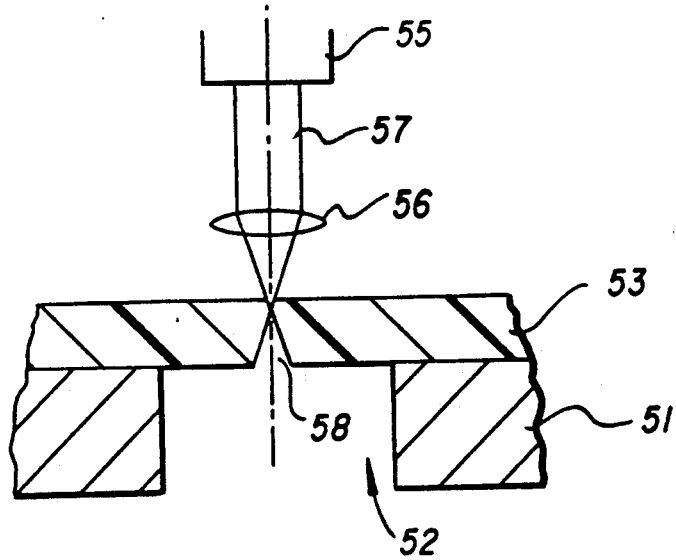
FIG. 6 is a partially schematic side cross-section illustrating manufacture of a vacuum hole according to the invention.

FIG. 6 illustrates a method of manufacturing such small holes with a conical shape. An aluminum core 51 has a vacuum opening 52 of substantial size, for example, 5 mm. It can be drilled by conventional techniques or formed in the original core manufacturing process. A layer 53 of at least intermediate conductivity, for example, a layer of polyurethane having conductive additives making its resistance in the neighborhood of $5 \times 10^9$ ohm-cm, is coated or otherwise applied to the surface of aluminum core 51. Layer 53 may, for example, be 6 mm thick.

A laser 55, generally of the type commonly used for fine drilling, would ordinarily have a fairly long focal length lens, say, 120 mm to concentrate the energy of the laser through a substantial thickness of material. However, in this instance a relatively short focal length lens 56, for example, a 60 mm lens, is used to focus a beam 57 at a position at or just below the surface of layer 53. The spread of the laser beam from lens 56 is an inverse function of its focal length. Therefore, with a short focal length lens the beam 57 spreads substantially as it passes through material 53 thereby forming a generally conically shaped hole 58.

Commercially available laser drilling devices commonly focus their beams to as small as 0.1 mm. As explained above, for best results in maintaining a vacuum, the vacuum hole 58 should have a smallest diameter somewhat larger than 0.1 mm. The commercial laser drilling apparatus automatically moves the laser beam in a circle to form holes of diameter larger than the size of the beam. That approach is also effective with a short focal length lens 56 to create a generally conical hole. For manufacturing tolerance reasons the point of focus may purposely be placed slightly below the outer surface of layer 53. Thus, the conical hole may in fact have its smallest diameter slightly below the surface. The term "conical" will be used herein to describe any shape which is generally larger at its base than it is at its top.

Prior vacuum holes in transfer drums have been manufactured by drilling holes, for example, 5 mm in diameter, directly through both layer 53 and layer 51 thereby forming essentially a single hole through both materials. However, direct mechanical drilling of holes smaller than 1 mm through materials as different as polyurethane layer 53 and aluminum layer 51 has proven to be quite difficult. Similarly, straight laser drilling through both surfaces of both materials have a tendency to create substantial heat in drilling through the aluminum which heat has an adverse effect on the adhesion between the polyurethane and the aluminum. Therefore, in practicing the method illustrated in FIG. 6, vacuum opening 52 is drilled or formed by conventional means prior to the application of layer 53.

Figure 7:
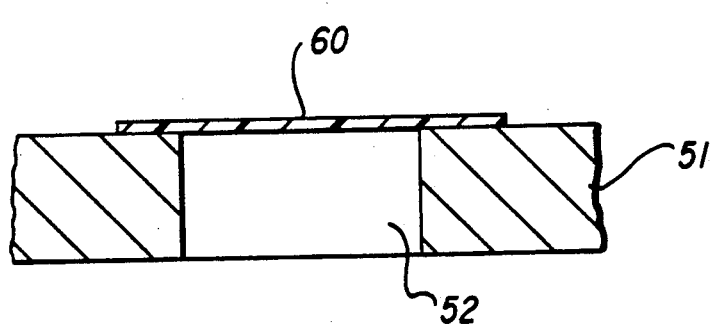
FIGS. 7, 8 and 9 are side sections similar to FIG. 6 illustrating an alternative method of forming a vacuum hole, which vacuum hole is shown in FIG. 9.
Figure 8:
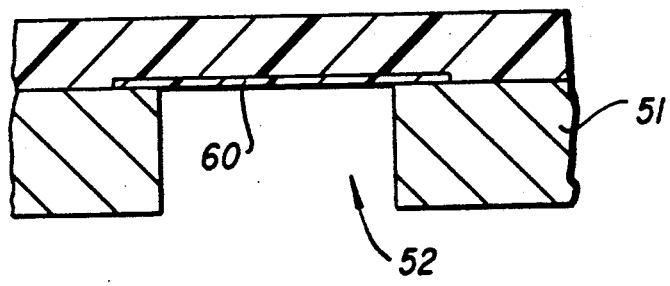
Figure 9:
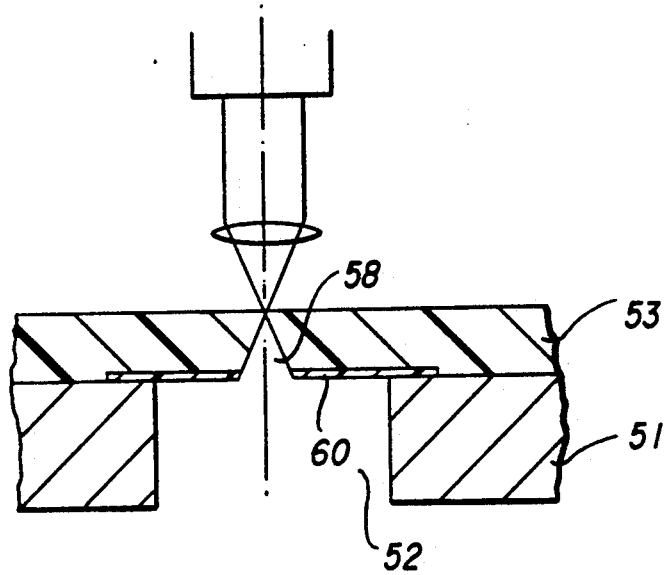

FIGS. 7, 8 and 9 show a method of providing the starting product for the process shown in FIG. 6. According to FIG. 7 the aluminum core has been drilled with vacuum opening 52. A piece of thin tape 60 is placed over vacuum opening 52. According to FIG. 8 the polyurethane is then molded or otherwise formed on top of the core 51 with the tape 60 preventing the polyurethane from sinking into opening 52 creating depressions in the surface and clogging opening 52. According to FIG. 9 then a conical hole 58 is drilled through both layer 53 and tape 60. To prevent damaging heating of the interface between the layers, the tape is chosen to not reflect the laser radiation. A conventional foam molding plug could also be used.

FIGS. 10, 11 and 12 show another embodiment of the method for forming a generally conical vacuum hole in layer 53. According to FIG. 10, a conventional laser beam 57 is applied to layer 53. Layer 53 has been coated on aluminum core 51 but no vacuum opening has been drilled in core 51. Because of the somewhat diffuse reflectivity of the surface of core 51 some of laser beam 57 is reflected at substantial angles from that of the incoming beam. This reflection has a tendency to destroy portions of layer 53 adjacent the core 51 forming a generally conical vacuum hole 58. Care must be taken to not overheat the layer interface or the bond between the polyurethane and the aluminum may be damaged around the hole.

Laser beam 57 is shown as a parallel beam. However, all present commercial laser drilling beams have some spread even with use of a relatively long focal length lens. This small spread of itself will directly form a vacuum hole only marginally preferable to a strictly cylindrical hole. However, with the additional spreading from the portion of the beam reflected off the aluminum surface, a conical hole with a base in excess of 1½ the diameter of the neck can be formed.

Aluminum core 51 must now be drilled quite carefully from the bottom to form an appropriate vacuum hole. This is shown in FIG. 11 using a large bit 80 which only slightly removes portions of layer 53 forming the end product shown in FIG. 12. This particular process has the disadvantage of requiring drilling of opening 52 from the rear of the core, which in many instances is inconvenient. It also requires quite precise drilling to avoid damage to layer 53.

As a similar alternative to this latter process, opening 52 can be drilled before applying layer 53 as in FIGS. 7-9. An appropriately reflective surface, for example, the surface of an aluminum plug is placed in opening 52 for the laser drilling process itself. The aluminum plug reflects the laser beam as in FIG. 10 and is removed after the drilling process.

FIG. 13 shows still another alternative approach to laser drilling a conical vacuum hole. According to FIG. 13, either the laser or the core 51 is tilted so that low spread laser beam 57 is rotated about a position 68 to form a generally conical vacuum hole in layer 53.

With all of these structures the end product is a hole that has a small enough opening at its narrowest point to reduce the usual discontinuity in the transfer electrical field. At the same time because that narrow portion of the opening is not as thick as the layer 53, the opening is less likely to clog with paper dust and toner particles. If, as is preferred, the vacuum holes are placed as close together as possible in a straight line, and if there is substantial spread in the hole as it approaches the inner surface of layer 53, the bases of the holes will overlap, see FIG. 5. Because of this the vacuum opening 52 may appropriately be a long narrow opening that communicates with a number of vacuum holes. Similarly, in the manufacturing process described with regard to FIGS. 7, 8 and 9, a single tape 60 would cover an opening or openings that communicate with a number of vacuum holes.

Although any even slight spreading of the hole as it extends deeper in the drum has a positive effect on reducing clogging, for best results, the diameter of the hole at the interface between layer 53 and vacuum opening 52 should be greater than 1½ times that of the diameter at the neck or narrowest portion of the hole. With a 6 mm thick layer 53, the wider diameter can be greater than 3 times that of the narrower, creating what appears to be a long narrow groove in the rear of layer 53.

We have found that when vacuum holes are not placed in a straight line adjacent the edge of the paper to be held, the holes that are further from the edge have less holding effect. Therefore, for best results, the straight line of holes shown in FIG. 5 should be placed as close as tolerances will allow to the edge of the paper to be secured and the line should be parallel to that edge, i.e., parallel to the axis of rotation of the drum.

The invention has been described in detail with particular reference to a preferred embodiment thereof, but it will be understood that variations and modifications can be effected within the spirit and scope of the invention as described hereinabove and as defined in the appended claims.

We claim:

1. Apparatus for transferring a toner image from an image-bearing member to a receiving sheet, said apparatus comprising:
    a transfer member having a surface and having vacuum opening means to said surface,
    means for applying a vacuum to said vacuum opening means to hold a receiving sheet on the surface of the transfer member, and
    means for creating an electric field urging a toner image toward a receiving sheet held on said surface,
    characterized in that said vacuum opening means include a line of closely spaced, laser drilled holes, said holes having a diameter at their narrowest point of 0.65 mm or less and being spaced to provide a concentration of at least 4 to a centimeter.

2. Apparatus for transferring a toner image from an image-bearing member to a receiving sheet, said apparatus comprising:
    a transfer drum having a cylindrical outer surface and having vacuum opening means to said surface,
    means for applying a vacuum to said vacuum opening means to hold a receiving sheet on the surface of the transfer drum, and
    means associated with said outer surface for creating an electric field urging a toner image toward said receiving sheet,
    characterized in that said vacuum opening means include a plurality of laser drilled holes, each hole being narrow at said surface and wider deeper in the drum.

3. Apparatus for transferring a toner image from an image bearing member to a receiving sheet, said apparatus comprising:
    a transfer drum having an axis and having a cylindrical conductive outer surface defined by an outer layer of intermediate conductivity, disposed on a conductive metal core, and having vacuum opening means through said core and outer layer to said surface,
    means for applying a vacuum to said vacuum opening means to hold a receiving sheet on the surface of the transfer drum, and
    means for creating an electric field urging a toner image toward said receiving sheet,
    characterized in that said vacuum opening means include opening means in said core and a line of closely spaced, laser drilled holes through said outer layer, said holes communicating with said opening means in said core and being generally conical in shape being narrower adjacent the surface and wider at the interface between the outer layer and the opening means in the core.

4. Apparatus according to claim 3 wherein the diameter of each hole at its narrowest point is less than 1 mm.

5. Apparatus according to claim 3 wherein the diameter of each hole at its narrowest point is 0.65 mm or less and the diameter of each hole at said interface is greater than one and one half times said diameter at the narrowest point.

6. Apparatus according to claim 3 wherein said line of holes is substantially parallel to the axis of the drum and the holes are sufficiently closely spaced that they overlap each other at said interface.

7. Apparatus according to claim 3 wherein there are at least four holes to a centimeter of said line.

8. Apparatus according to claim 6 wherein there are at least four holes to a centimeter of said line, and the diameter of each hole at its narrowest point is 0.65 mm or less.

9. Apparatus for forming multicolor toner images on a receiving sheet, said apparatus including
    means for forming a series of electrostatic images on an image bearing member,
    means for toning said electrostatic images with toners of different colors,
    apparatus for transferring a plurality of said images to a receiving sheet in registry with each other image, to form a multicolor image on said receiving sheet, wherein said transferring apparatus is constructed according to claim 1.

10. Apparatus according to claim 9 wherein said transfer member is a transfer drum having at least two sets of vacuum holes formed in straight lines running parallel to its axis, one to hold the leading edge of each of two receiving sheets.

* * * * *